March 27, 1962 J. S. PAPPS ETAL 3,026,621
HOLE POSITION GAUGING MEANS
Original Filed July 2, 1958
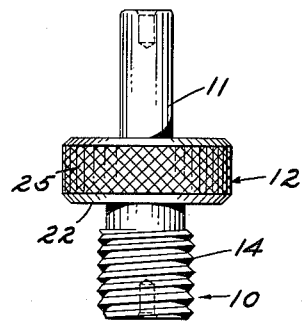
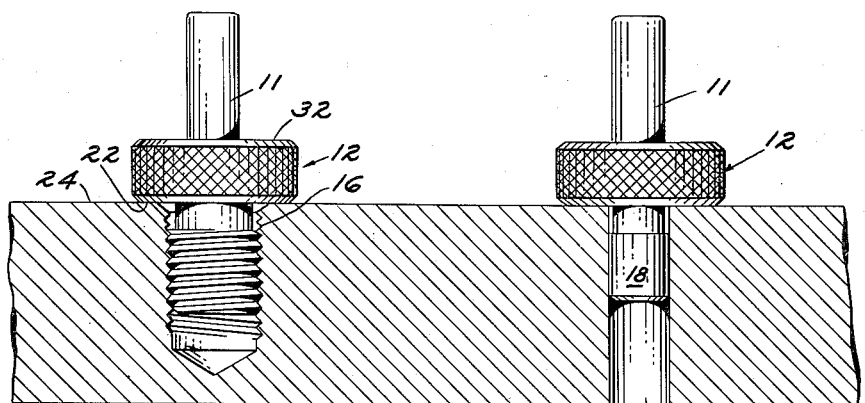
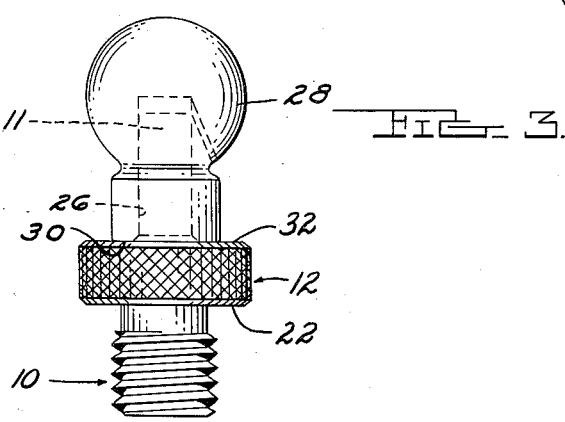

United States Patent Office 3,026,621
Patented Mar. 27, 1962

3,026,621
HOLE POSITION GAUGING MEANS
Joseph S. Papps, 15371 Ferguson, Detroit, Mich., and Robert J. Spencer, 6232 Oakman, Dearborn, Mich.
Continuation of application Ser. No. 746,193, July 2, 1958. This application Feb. 19, 1960, Ser. No. 9,971
1 Claim. (Cl. 33—174)

This application is a continuation of our copending application Serial No. 746,193, filed July 2, 1958, now abandoned.

The present invention relates to gauging accessories adapted to be inserted in pre-formed holes of different diameters and to be used in conjunction with conventional gauging devices to facilitate and increase the accuracy and speed of measuring the locations of the hole centers with respect to each other and/or with respect to other reference points.

My improved gauging accessories are constructed in sets consisting of a plurality of individual units. Each unit constitutes a locating and abutment device, or locator, having a hole-engaging portion which constitutes a support for the device when in use. Each such supporting portion is proportioned differently from the corresponding supporting portions of the other locators of the set. Each locator also has a gauging abutment stem portion, formed in accurately coaxial relation with its supporting portion. All of the stem portions of all of the locators are alike and standardized in their dimensioning. The supporting portions are proportioned for a free and accurate fit in holes of varying sizes, while the gauging stem portions furnish a precise dimension transverse to the axis of concentricity and which is the same for all of the locator units. Each locator is also provided with a standardized intermediate portion which limits the insertion of the device in the hole in the workpiece, thereby accurately locating the gauging stem section.

The intermediate portion constitutes a convenient handle for insertion and removal of the device, and is also accurately proportioned to a standardized thickness, and so related to the stem that a standardized socketed ball-like accessory may be fitted downwardly over the stem and bear against the surface of such intermediate portion. Such accessory ball, when so placed upon the stem, is accurately positioned both as to its height above the work, and as to its center, which then is located on the common axis of the stem and supporting portion of the locating unit. Such accessory balls can accordingly be used upon all of the locators, despite the differences in the supporting portions of the latter.

Some of the supporting portions are provided with threads, to adapt them for insertion in internally threaded holes in accurate coaxial relation thereto, while other supporting portions, of different locator units, are provided with smooth cylindrical supporting portions for insertion in drilled and bored holes and the like. The positioning of the intermediate portions and locating stem portions are standardized and rigidly accurately controlled, however, by the positioning, dimensioning and relationship of such intermediate and stem portions, which, in all units, are related in like fashion to the axis of the supporting portion. With my improved locators, therefore, it is possible to quickly and accurately determine the locations of holes of different sizes, and by the use of the standardized accessory balls, this may be effectively done even when the axes of the holes are not parallel to one another. Further, in view of the standardized dimensioning of the intermediate portion, stem portion and accessory balls in the axial direction, measurements may be accurately made in an axial direction, including determinations as to the relative heights and distances between surfaces of different elevations in which holes have been formed.

When the accessory balls are not used, rapid gauging of the positioning of a plurality of holes of different types and diameters can be made in a single gauging operation, by means of a plate-type perforated go-no go gauge. With the use of my improved locators, having standardized stem portions, the work may be quickly gauged by inserting one of my locators in each hole of the workpiece. A plate-type go-no go gauge is provided with a plurality of holes of the same diameter as the standard stem diameter, accurately located in the gauge in the desired positioning of the holes. The plate will then readily slip down over all of the stems, if the holes in the workpiece are in fact properly located with respect to one another, while if any single hole is out of position, the gauge will not fit the stems. Thus a determination can be made instantly as to whether the holes are in the proper relative positioning.

Other objects and advantages of the present invention will become apparent upon consideration of the present disclosure in its entirety.

In the drawing:

FIGURE 1 is a side elevational view of one of my locating units having a threaded hole-engaging supporting portion;

FIG. 2 is a sectional elevational view of a workpiece showing two of my locators having supporting portions of different sizes and characteristics installed therein, ready for a gauging operation; and FIG. 3 is a view similar to FIG. 1 illustrating an accessory ball installed upon the locator.

Referring now to the drawing:

Each locator unit has a hole-engaging supporting portion 10, a gauging stem 11, and an enlarged intermediate portion 12. The supporting portion 10 and gauging stem 11 are formed in accurately coaxial relation, the gauging stem 11 preferably having a cylindrical surface and a precisely held diameter which is the same for all locators.

The diameter of the hole engaging portion 10 is determined by that of the hole to be engaged, and this hole engaging portion may be formed with threads 14 corresponding to the threads 16 of a hole, or with a substantially cylindrical portion, as 18, preferably having a slight taper for a portion of its length, as shown, for engaging the internal diameter 20 of a plain hole. In either case the supporting portion is dimensioned for free but accurate fitting engagement in a hole so that the locator may be easily inserted and removed. Accurate centering in the hole is insured by the tapered shape of the portion 18, or by the engagement of the threads 14 and 16, in combination with the engagement of a shoulder 22 on the locator with the surface 24 surrounding the hole. Shoulder 22 is a part of the intermediate portion 12 and is formed precisely at right angles to the axis of the locator.

The intermediate portion 12 thus acts as an element of a means for centering the locator in a hole and also provides a means for actuating the locator for inserting and withdrawing the locator from a hole to be checked. This portion includes knurling 25, and is of accurately standardized thickness in an axial direction, for another purpose, which will presently be explained.

FIG. 3 illustrates an auxiliary ball member for use when measurements must be taken at an angle other than normal to the hole axis. The ball includes a radial cylindrical socket 26 having a length in excess of the length of the stem 11 and a diameter which is held for precise over-engagement upon the stem 11, as shown. A spherical gauging surface 28 is formed on a center which lies on the longitudinal axis of the socket 26 and the location of this center is precisely held relative to the end surface 30 of the ball member. This end surface is formed at right angles to the longitudinal axis of the socket and engages the outer shoulder 32 of the intermediate locator portion 12. Shoulder 32 is formed at right angles to the locator axis and at a precisely held distance from the shoulder 22.

The outer shoulder 32, together with its dimensioning relative to the locating shoulder 22 and the precise location of the center of the spherical gauging surface 28, form a means for locating the spherical center relative to the surface surrounding the hole to be checked and for locating the spherical center axially of the hole to be checked. Dimensions can therefore be taken at other than a right angle to the hole axis with complete accuracy, as, for example, in checking the distances between holes and surfaces that are not parallel to one another, and in determining the differences in the elevations of surfaces. When the ball is used, its surface furnishes an abutment from which, by conventional gauging and measuring means, the datum point represented by the center of the ball can easily be located with respect to the other positions, while without the ball, the stems furnish datum abutments for transverse measurements.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

Means for facilitating the gauging of the axial spacing between a plurality of round holes of different sizes in a workpiece or the like, comprising a plurality of locating members, one for each hole, each member having a generally cylindrical supporting portion at one end, the corresponding supporting portions of different members being of different diameters to fit such different sized holes, each of said members having at its opposite end a single cylindrical datum abutment stem portion, all of said abutment stem portions being of the same length and diameter and coaxial with the supporting portion of the member, a combined shoulder and gripping portion on each of said members located between and of greater diameter than the two previously mentioned portions, all of said combined shoulder and gripping portions being of the same thickness measured along the common axis of said two mentioned portions, and an accessory abutment element having a spherical surface portion and an open end, a substantially cylindrical socket therein radial to said spherical surface portion and proportioned to overfit accurately upon the cylindrical surface of said stem portions, but deeper than the length of said stem portions, whereby said element may be fitted on the stem portion of one of said members with the center of its spherical surface located on said common axis of the member, said accessory element having a shoulder portion at the open end of the socket located at a prefixed distance from said center and adapted to seat against said combined shoulder and gripping portion of such member, to thereby coact with said combined shoulder and gripping portion to locate said center at a predetermined distance from a work surface area surrounding a hole in which the member is fitted.

References Cited in the file of this patent

UNITED STATES PATENTS

| | | |
|---|---|---|
| 2,419,134 | Hall | Apr. 15, 1947 |
| 2,710,454 | Kershaw | June 14, 1955 |

FOREIGN PATENTS

| | | |
|---|---|---|
| 573,748 | Germany | June 4, 1931 |
| 728,426 | England | Apr. 20, 1955 |

OTHER REFERENCES

American Machinist, article by Belbes, p. 858, Sept. 22, 1937.

Starrett Catalog No. 25, p. 280, received May 10, 1937. (Copy in Div. 66.)